(12) United States Patent
Abarca Melo et al.

(10) Patent No.: US 9,206,906 B2
(45) Date of Patent: Dec. 8, 2015

(54) ADJUSTABLE MECHANICAL SEAL

(75) Inventors: Ricardo Abarca Melo, Santiago (CL); Rodrigo Guzman Castro, Santiago (CL); Osvaldo Quiroz Venegas, Santiago (CL)

(73) Assignee: Vulco, S.A. (CL)

( * ) Notice: Subject to any disclaimer, the term of this patent is extended or adjusted under 35 U.S.C. 154(b) by 0 days.

(21) Appl. No.: 13/138,664

(22) PCT Filed: Mar. 16, 2010

(86) PCT No.: PCT/AU2010/000308
§ 371 (c)(1),
(2), (4) Date: Dec. 8, 2011

(87) PCT Pub. No.: WO2010/105296
PCT Pub. Date: Sep. 23, 2010

(65) Prior Publication Data
US 2012/0134799 A1    May 31, 2012

(30) Foreign Application Priority Data

Mar. 16, 2009   (CL) .................................. 0629-2009
Mar. 16, 2009   (CL) .................................. 0630-2009

(51) Int. Cl.
*F16J 15/34*   (2006.01)
*F04D 29/12*   (2006.01)
*F16C 17/04*   (2006.01)
(Continued)

(52) U.S. Cl.
CPC ............... *F16J 15/344* (2013.01); *F04D 29/12* (2013.01); *F04D 29/126* (2013.01); *F16C 17/04* (2013.01); *F16J 15/3404* (2013.01); *F16J 15/3448* (2013.01); *F16J 15/3464* (2013.01); *F16J 15/36* (2013.01); *F16J 15/38* (2013.01)

(58) Field of Classification Search
CPC ...... F16J 15/344; F16J 15/3452; F04D 29/12; F04D 29/126
USPC ............ 415/231, 206, 213.1, 214.1; 277/358, 277/370–371, 398
See application file for complete search history.

(56) References Cited

U.S. PATENT DOCUMENTS 3,643,967 A   2/1972   Stahl
4,183,542 A   1/1980   Quartara
(Continued)

FOREIGN PATENT DOCUMENTS

AU    619522    12/1989
AU    657198    8/1993
(Continued)

OTHER PUBLICATIONS

Foreign reference document of WO 95/00780.*

*Primary Examiner* — Edward Look
*Assistant Examiner* — Juan G Flores
(74) *Attorney, Agent, or Firm* — Morriss O'Bryant Compagni

(57) ABSTRACT

A mechanical seal is disclosed that has first and second sealing faces that are urged into contact to form a seal therebetween. One sealing face is mounted on a rotatable portion of the seal and the second sealing face is mounted on a support assembly. The joint further includes a joint permitting rotary movement between the support assembly and a stationary portion of the seal to allow adjustment of the portion of the rotatable portion relative to the stationary portion without affecting the alignment of the first and second sealing faces.

19 Claims, 6 Drawing Sheets

(51) Int. Cl.
*F16J 15/36* (2006.01)
*F16J 15/38* (2006.01)

(56) References Cited

U.S. PATENT DOCUMENTS

| | | | |
|---|---|---|---|
| 4,411,437 A | 10/1983 | Conti | |
| 4,418,919 A * | 12/1983 | Wentworth | 277/371 |
| 4,521,025 A | 6/1985 | Leonardsson | |
| 4,575,306 A | 3/1986 | Monnot | |
| 4,703,939 A | 11/1987 | Wentworth | |
| 4,795,167 A | 1/1989 | Otsuka | |
| 5,112,140 A * | 5/1992 | Cherny et al. | 384/16 |
| 5,192,085 A | 3/1993 | McOnie | |
| 5,199,720 A * | 4/1993 | Radosav et al. | 277/370 |
| 5,324,048 A * | 6/1994 | Carmody | 277/367 |
| 5,328,276 A | 7/1994 | Linteau | |
| 5,344,164 A * | 9/1994 | Carmody et al. | 277/371 |
| 5,590,966 A | 1/1997 | Cherny et al. | |
| 5,662,171 A | 9/1997 | Brugman et al. | |
| 5,725,219 A | 3/1998 | Gilbert | |
| 5,947,479 A * | 9/1999 | Ostrowski | 277/306 |
| 6,145,841 A | 11/2000 | Maeda | |
| 6,398,223 B1 | 6/2002 | Radosav | |
| 6,585,416 B1 | 7/2003 | Rimmer | |
| 6,637,509 B2 * | 10/2003 | Farquharson et al. | 166/84.1 |
| 6,916,022 B2 * | 7/2005 | Auber | 277/512 |
| 7,090,403 B2 | 8/2006 | Orlowski et al. | |
| 2005/0230923 A1 | 10/2005 | Kametaka et al. | |
| 2007/0241511 A1 | 10/2007 | Kim | |
| 2007/0241514 A1 | 10/2007 | Orlowski et al. | |
| 2008/0036154 A1 | 2/2008 | Okamoto et al. | |

FOREIGN PATENT DOCUMENTS

| | | | |
|---|---|---|---|
| CN | 1134525 A | 10/1996 | |
| CN | 200982322 Y | 11/2007 | |
| CN | 201031809 Y | 3/2008 | |
| DE | 3734888 A1 | 4/1989 | |
| DE | 3737094 C1 | 5/1989 | |
| DE | 4121819 A1 | 2/1993 | |
| DE | 10120409 A1 | 11/2002 | |
| DE | 102006029678 A1 | 1/2008 | |
| EP | 0619145 A2 | 10/1994 | |
| GB | 773870 A | 5/1957 | |
| GB | 905537 * | 9/1962 | |
| GB | 905537 A | 9/1962 | |
| GB | 1486541 | 9/1977 | |
| JP | 7217794 A | 8/1995 | |
| JP | 7243396 A | 9/1995 | |
| JP | 8232657 A | 9/1996 | |
| JP | 9287586 A | 11/1997 | |
| JP | 10218096 A | 8/1998 | |
| JP | 11062890 A | 3/1999 | |
| JP | 22285995 A2 | 10/2002 | |
| JP | 22327846 A2 | 11/2002 | |
| JP | 23097727 A2 | 4/2003 | |
| JP | 24263585 A2 | 9/2004 | |
| JP | 24316780 A2 | 11/2004 | |
| RU | 1789806 A1 | 1/1993 | |
| RU | 1789809 A1 | 1/1993 | |
| RU | 2072460 C1 | 1/1997 | |
| RU | 2241882 C1 | 12/2004 | |
| RU | 4135954 A | 5/2006 | |
| SU | 1201599 A1 | 12/1985 | |
| SU | 1569482 A1 | 6/1990 | |
| SU | 1590781 A1 | 9/1990 | |
| SU | 1710901 A1 | 2/1992 | |
| WO | 8000366 | 3/1980 | |
| WO | 8902555 A1 | 3/1989 | |
| WO | 9500780 | 1/1995 | |
| WO | WO 9500780 A1 * | 1/1995 | F16J 15/56 |
| WO | 9807988 | 2/1998 | |
| WO | 2004055379 A1 | 7/2004 | |

* cited by examiner

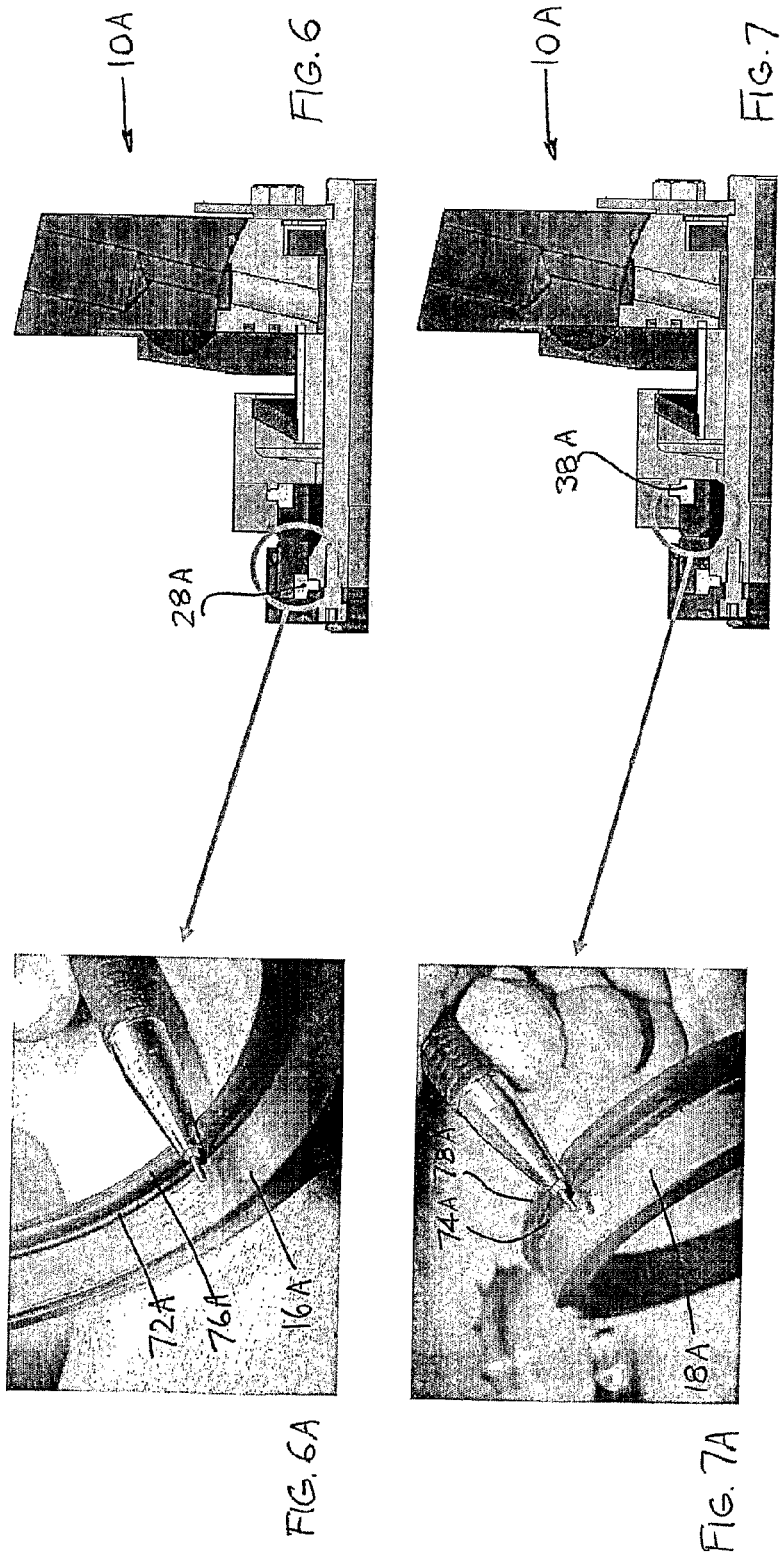

ADJUSTABLE MECHANICAL SEAL

TECHNICAL FIELD

This disclosure relates to a mechanical seal for providing a fluid seal between rotatable and stationary components. The mechanical seal has been developed especially, but not exclusively for use in fluid pumps, such as slurry pumps, where the mechanical seal is mounted between a rotatable drive shaft and a pump casing and is herein described in that context. However, it is to be appreciated that such a mechanical seal can have broader application and is not limited to that use.

BACKGROUND ART

Mechanical seals have been used to provide a fluid seal between a rotatable shaft and a fluid containing chamber. As such, mechanical seals have application in pumps where the drive shaft of an externally mounted pump motor extends through a pump casing to drive a pump impeller. In such an application, the mechanical seal is typically situated where the rotatable shaft enters or leaves the casing and is fitted to the casing and the rotatable shaft to provide a seal between those components.

Such mechanical seals generally comprise some components which rotate with the shaft (or other rotatable portion of the equipment to which it is fitted) and those components which are fitted to the stationary parts of the equipment. At the interface between these rotary and stationary components are contacting sealing faces; one which rotates and the other which is stationary. These sealing faces are in opposed relation and arranged to be urged into contact to form a fluid seal therebetween.

In the past, problems have been encountered in using mechanical seals in some pumping applications, particularly in mining slurry pumps because of the harsh environment created in the pumps by the slurry, the high loading induced on the pump components during start up and operation, and the need for continual operation of the pumps over extended periods. Accordingly, there is an ongoing need to improve the design of the mechanical seal to improve its suitability in pumping applications.

SUMMARY OF THE DISCLOSURE

In a first aspect, there is provided a mechanical seal comprising a stationary portion; a rotatable portion; and a support assembly mounting the rotatable portion to the stationary portion, the rotatable portion being rotatable relative to the support assembly about a rotation axis, and the mechanical seal further comprising opposed first and second sealing faces, the first sealing face mounted on the rotatable portion and the second sealing face mounted on the support assembly, the sealing faces being arranged to be urged into contact to form a seal therebetween; and a joint permitting rotary movement between the support assembly and the stationary portion to allow adjustment of the position of the rotatable portion relative to the stationary portion without affecting the alignment of the first and second sealing faces.

A feature of the mechanical seal is that the support assembly is able to be rotated relative to the stationary portion. This is advantageous as it allows the mechanical seal to be fitted to equipment where the rotatable shaft is out of alignment with the equipment casing. Furthermore, and importantly, this ability to accommodate this angular variation can be achieved without providing any consequential misalignment of the sealing faces of the seal.

In one form, the stationary portion includes an aperture through which the rotatable portion extends, and the joint is formed between an outer surface of the support assembly and an inner surface of the stationary portion that defines the aperture. In a particular form, the outer and inner surfaces are in sliding contact. In another form an intermediate material (such as for example a resilient elastomer) is disposed between the inner and outer surfaces so that the surfaces are not in direct contact.

In a particular form the outer and inner surfaces form a ball joint to permit the rotary movement in all directions. Such an arrangement is advantageous as it provides a greater ability for the seal to accommodate misalignment between the rotary and stationary components in which the mechanical seal is fitted.

To ensure the functionality of the mechanical seal, it is necessary to prevent leakage through the interface between the support assembly and the stationary component and in this respect this may occur by making the joint fluid impervious. An alternative to making the joint fluid impervious is to isolate the joint from fluid in the equipment. In one form, an external cover seal extends across the joint to inhibit fluid penetration between the inner and outer surfaces. In addition, or instead of, a seal may be provided between the inner and outer surfaces.

In a particular form, the joint prevents axial movement of the rotatable portion relative to the stationary portion in at least one direction. This then allows the joint to accommodate loading that is induced in the mechanical seal to maintain the sealing faces in contact.

In a particular form, the support assembly has a base portion that incorporates the outer surface, a movable portion on which the second sealing face is disposed, and a biasing device disposed between the movable portion and the base portion. The purpose of the biasing device is to impart a biasing force to move the second sealing face into contact with the first sealing face. In one form, the biasing device comprises a resilient ring that is placed in tension to impart the biasing force to the second sealing face In a particular form, the support assembly comprises an inner bearing surface that supports the rotatable portion.

In yet a further aspect, embodiments are disclosed of a pump including a pump casing having an aperture, a drive shaft that extends through the aperture, and a mechanical seal according to any preceding claim providing a fluid seal between the casing and the drive shaft, wherein the rotatable portion of the mechanical seal is mounted to the drive shaft and the stationary portion of the mechanical seal is mounted to the pump casing.

BRIEF DESCRIPTION OF THE DRAWINGS

It is convenient to describe an embodiment of the mechanical seal with reference to the accompanying drawings, in which:

FIG. 6 is a side elevation of the mechanical seal of FIG. 5;

FIG. 6a is a perspective view of a portion of the mechanical seal of FIG. 6;

FIG. 7 is a side elevation of the mechanical seal of FIG. 5; and

FIG. 7a is a perspective view of a portion of the mechanical seal of FIG. 7.

DETAILED DESCRIPTION

Figure 1:
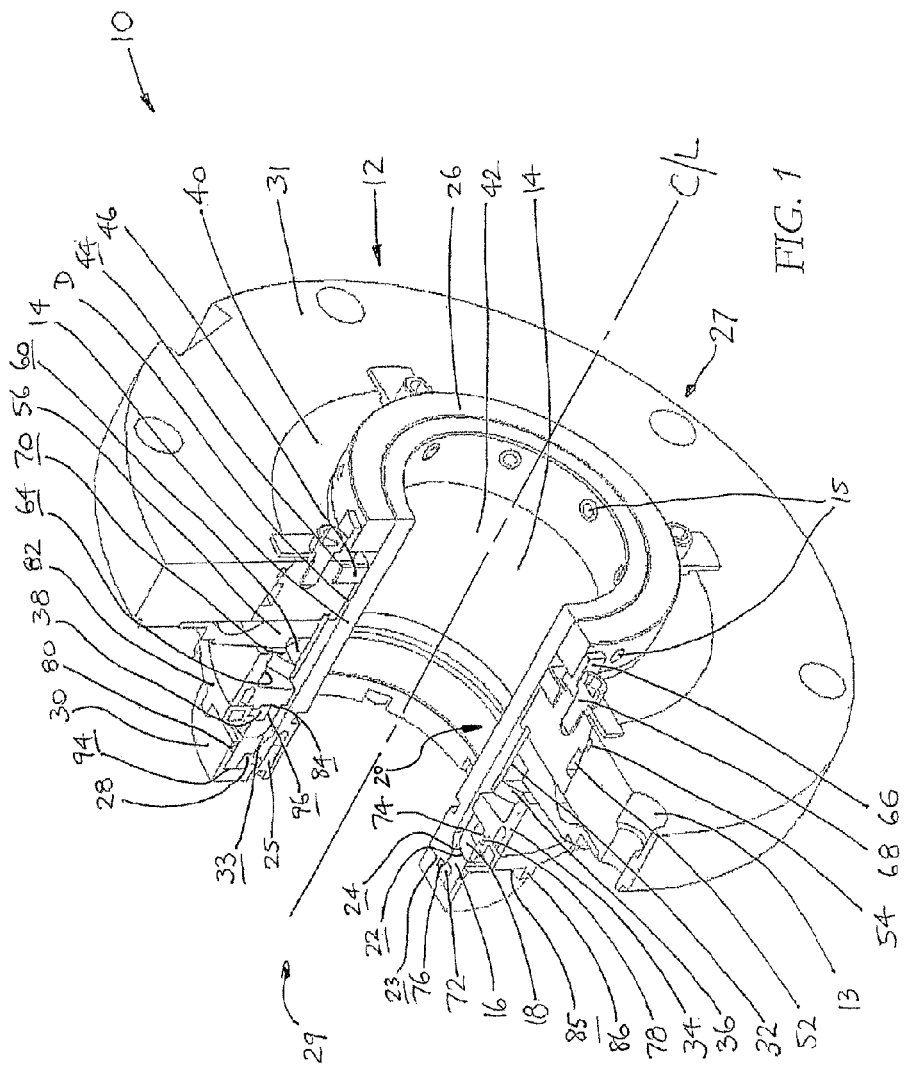
FIG. 1 is a perspective view (with quarter section removed) of a mechanical seal.
Figure 2:
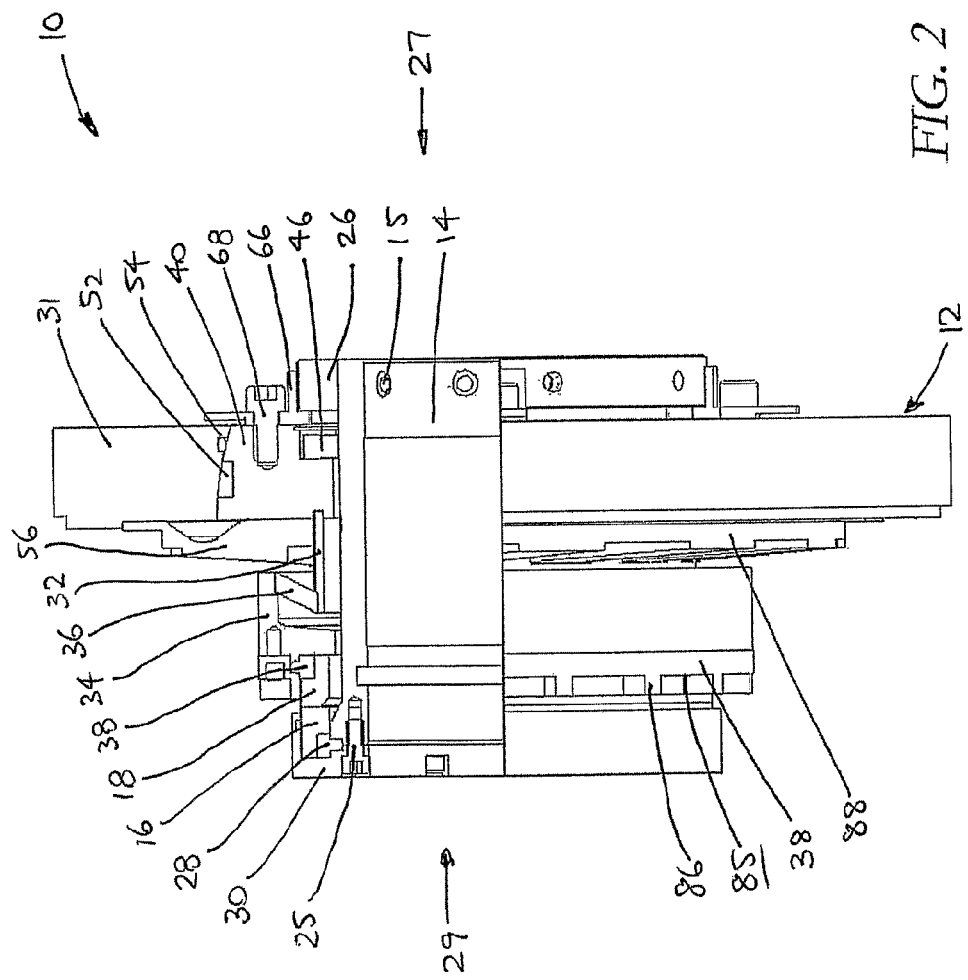
FIG. 2 is a side elevation of the mechanical seal of FIG. 1.
Figure 3:
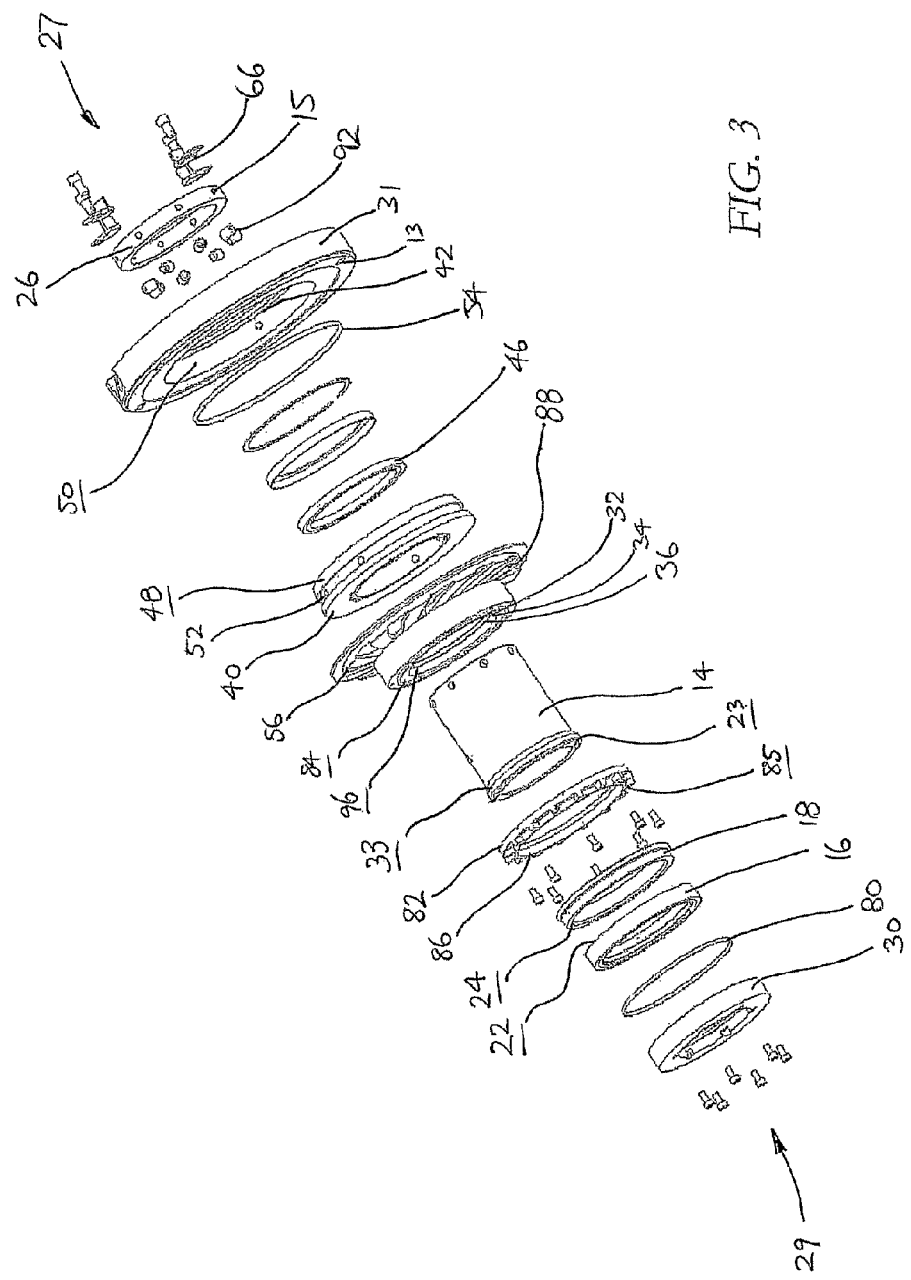
FIG. 3 is an exploded view of the components of the mechanical seal of FIG. 1.

Turning to the drawings, in FIG. 1 a mechanical seal 10 is disclosed which is for use in providing a sealing interface between rotary and stationary components. Broadly, the mechanical seal 10 includes a stationary part or housing 12 in the form of a generally annular-shaped flange or ring 31 and a rotatable part which is generally in the form of a shaft sleeve 14 which extends through the housing 12 and is rotatable about an axis CL. There are various components which connect the rotatable and stationary parts, which will now be described.

To form a fluid seal between the stationary annular flange 31 and the rotatable shaft sleeve 14, a pair of sealing members in the form of continuous rings 16, 18 are provided. In use, the rings 16, 18 are mounted on respective support structures of the seal 10. In the embodiment as shown, one of the sealing rings 16 rotates and is affixed to the shaft sleeve 14, whereas the other sealing ring 18 remains stationary by being fitted to the stationary housing 12 through a support assembly 20 (the various components of which will be described shortly). Each of the sealing rings 16, 18 includes a respective annular sealing face (22, 24) which in use are located in opposing relation and are smoothly finished. The sealing faces 22, 24 are arranged to be urged into contact with one another to form a fluid seal therebetween, as will be described.

Figure 4:
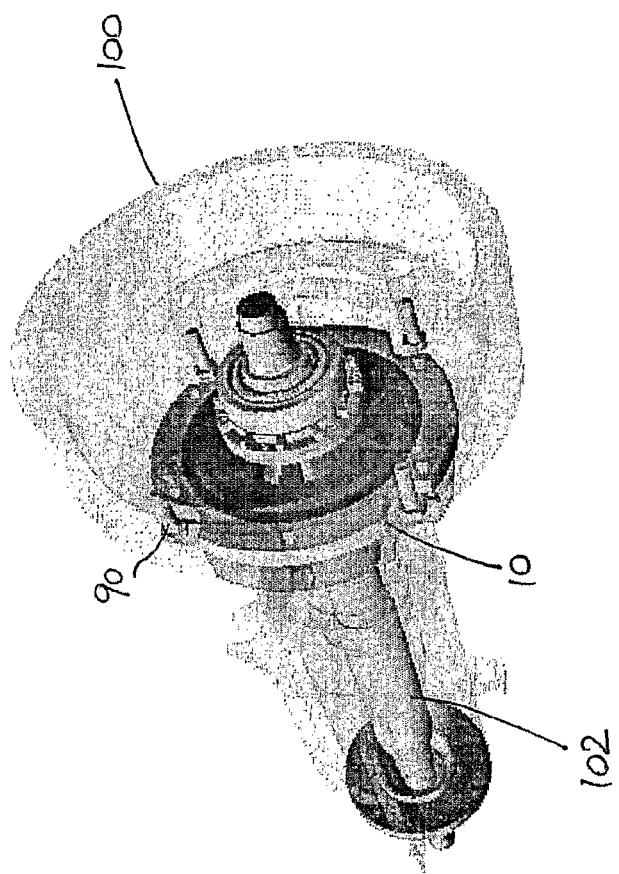
FIG. 4 is a schematic illustration of the mechanical seal of FIG. 1 connected to a pump casing and drive shaft.

The mechanical seal 10 according to the above form is suitable for use in a centrifugal pump (for example, as shown in FIG. 4). The mechanical seal 10 provides a fluid barrier between a pump casing 100 and the rotatable drive shaft 102 which is fitted with a shaft sleeve 14. The shaft sleeve 14 houses (and turns with) the rotatable drive shaft 102, which connects a drive motor (not shown) to a pump impeller (not shown) that is located inside a pumping chamber of the pump. The pump casing 100 is bolted to the housing 12 of the mechanical seal 10 via screws which fit into receiving holes 13. The rotatable drive shaft 102 is fitted by bolts, rivets or screws 92 which are located into receiving holes 15 to fasten it to the rotatable shaft sleeve 14 of the mechanical seal 10.

The rotatable shaft sleeve 14 of the mechanical seal 10 is typically made of a material such as machined stainless steel (for example AISI 316). The shaft sleeve 14 includes a drive collar 26 mounted at a rear end 27 of the shaft sleeve 14, which is on the exterior side of the stationary housing 12 and pump casing 100, and outside of any contact with the fluid inside the pump. The shaft sleeve 14 also incorporates the rotatable sealing ring 16 at an opposite (front) end 29 of the shaft sleeve 14, which is at the region of the mechanical seal 10 which is in contact with the fluid, inside of the pump. The sealing ring 16 is disposed on an outer surface 33 of the shaft sleeve 14 and is oriented so that its respective sealing face 22 faces back towards the rear end 27 of the shaft sleeve 14. The sealing ring 16 (which is typically made from a ceramic such as silicon carbide, or a hard metal material such as tungsten carbide) is coupled to the shaft sleeve 14 via a mounting assembly including a mount in the form an elastomeric coupling 28, and a clamping collar 30 which clamps around the sealing ring 16 and holds it to the shaft sleeve 14 using a screwing arrangement 25. The function and operation of the mounting assembly will be described in more detail below.

The support assembly 20 is located between the shaft sleeve 14 and the housing 12 and is arranged to "float", meaning that it is not rigidly attached to either the housing 12 or to the shaft sleeve 14). The support assembly 20 has multiple functions, being:
- to support the stationary sealing ring 18;
- to provide a biasing force to the sealing ring 18 to urge it into contact with the rotatable sealing ring 16;
- to provide a fluid barrier between the housing 12 and the sealing ring 18. When fitted to a pump, the fluid barrier formed by the support assembly 20 becomes an internal surface of the pump chamber; and
- to support the rotatable shaft sleeve 14 relative to the stationary annular flange 31 forming the housing 12.

To allow for these different functions, the support assembly 20 comprises:
- a base portion in the form of an annular hub 40 that is fitted within the annular flange 31 of the housing 12 and around the shaft sleeve 14 and a circumferential cylinder or sleeve 32 which projects from the hub 40 and extends around, and is spaced from, the shaft sleeve 14;
- a movable portion in the form of a circumferential flanged boss 34; and
- a biasing device in the form of an elastomeric ring 36 disposed between the sleeve 32 and the movable flanged boss 34.

The movable flanged boss 34 has the stationary sealing ring 18 of the mechanical seal fitted at a leading end thereof through a second mounting assembly which includes a second mount in the form of an elastomeric coupling 38. The resilient, elastomeric ring 36 is arranged to impart a biasing force on the moveable flanged boss 34 to urge the sealing ring 18 to move relative to the base circumferential sleeve 32 and into face-to-face close contact with the rotatable sealing ring 16.

The annular flange 31 and the hub 40 are both typically formed from machined steel, such as machined stainless steel (for example AISI 316). The hub 40 includes a central aperture 42 through which the shaft sleeve 14 extends, with a small circumferential clearance distance D thereabout. An inner surface 44 of the hub 40 includes a bearing 46 which extends across the clearance distance D and on which the shaft sleeve 14 rotates. In the illustrated form, the bearing 46 is formed as a carbon slip ring of rectangular cross-section.

The outer circumferential surface 48 of the hub 40 is in sliding contact with an inner circumferential surface 50 of the annular flange 31 of the housing 12, so as to form a joint therebetween. To reduce friction between these surfaces, an annular groove 52 is incorporated in the outer surface 48 of the hub 40. An o-ring seal 54 is also arranged in a small circumferential groove located on the interior surface 50 of the annular flange 31 and positioned between the contacting surfaces 48, 50 to provide a secondary fluid seal therebetween.

An elastomeric boot 56 extends across the front face of the annular flange 31 to partially cover the annular flange 31 and all of the hub 40, including covering over the joint between these components 31, 40 and inhibiting fluid penetration between the inner surface 50 of the annular flange 31 and the outer surface 48 of the hub 40. This boot 56 provides a primary seal against the ingress of fluid and particulate matter on the side of the mechanical seal 10 which is in contact with the fluid inside the pump, but without unduly restricting the sliding nature of the contact between the hub 40 and the annular flange 31.

A feature of the mechanical seal 10 is that the contacting surfaces 48, 50 of the hub 40 and the annular flange 31 are arcuate and more specifically, the hub outer surface 48 is part spherical so as to form a ball joint (or ball-and-socket type joint) between the hub and the annular flange 31 portion of the housing 12. This allows the support assembly 20 and rotary shaft sleeve 14 to "float" and to be tilted relative to the stationary housing 12, so that the axis of rotation of the drive shaft 102 and the shaft sleeve 14 can be moved in all directions away from alignment with the central axis CL of the aperture 42 of the hub 40. In fact, the ball joint which is formed between the hub 40 and the annular flange 31 in the mechanical seal 10 can accommodate a relatively large angular variation between these two axes (in the order of up to 5-10°). This is advantageous since it allows the mechanical seal 10 to be fitted to equipment where the rotatable shaft is out of alignment with the equipment casing which is joined to the annular flange 31 (via screws in receiving holes 13). Furthermore, and importantly, this ability to accommodate this angular variation can be achieved without providing any consequential misalignment of the sealing faces 22, 24 of the respective sealing rings 16, 18, and leakage of fluid therethrough.

The sleeve 32 of the support assembly 20 is supported by, and projects from, the hub 40. The sleeve 32, which is typically formed of steel, such as stainless steel, surrounds but is spaced from the rotatable shaft sleeve 14, and provides a seat for the inner circumference of the elastomeric ring 36. In the illustrated form, the elastomeric ring 36 is formed from a viscoelastic material such as a polymeric elastomer. The ring 36 extends around the outer surface 60 of the sleeve 32 and is bonded to the sleeve 32 preferably by a vulcanizing process so as to form a strong connection that is fluid impervious.

The flanged boss 34 (that connects to the stationary sealing ring 18) is formed as a ring which is L-shaped in cross-section and has an inner surface 64 that fits over, and is bonded on, an outer circumference of the elastomeric ring 36, again preferably by a vulcanizing process to provide both a strong, fluid impervious connection between those elements. The flanged boss 34 is typically formed from metal such as stainless steel and, together with the other parts of the movable portion of the support assembly 20, extends around but is spaced from the rotatable shaft sleeve 14. In this way the flanged boss 34 is fully supported on the elastomeric ring 36.

The resilient, elastomeric ring 36 not only supports the movable portion (flanged boss 34) of the support assembly 20 but is arranged to urge that portion forward (i.e. towards the shaft end 29) so as to maintain the sealing faces 22, 24 of the respective sealing rings 16, 18 in contact. This is achieved by preloading the elastomeric ring 36, by moving/positioning the flanged boss 34 in relation to the sleeve 32 so as to deform the elastomeric ring 36 and place that ring in tension, and then hold those components in that position (that is, the elastomeric ring 36 is placed in tension by movement of the flanged boss 34 rearward towards the rear end 27 of the shaft). This tensioning thereby induces a biasing force on the sealing ring 18 to urge it forward against the outer sealing ring 16 and to maintain a closed gap therebetween. The structure of the elastomeric ring 36 allows the biasing force to be applied uniformly on the sealing ring 18 and about the axis of rotation of the rotatable shaft sleeve 14 and the rotatable sealing ring 16.

The amount of preload applied to the elastomeric ring 36 is dependent on the amount of axial movement of the flanged boss 34 relative to the sleeve 32. As the shaft sleeve 14 is movable relative to the hub 40 (and therefore can be moved axially along the drive shaft 102), this axial movement needs to be constrained to maintain the preload in the elastomeric ring 36. This is achieved by the use of T-shaped setting tabs 66 which are mounted to the hub 40 and removed upon installation of the mechanical seal 10. The setting tabs 66 are typically fixed to the hub 40 by bolts or screws 68 and arranged to anchor about the drive collar 26 to fix the axial position of the hub 40 on the shaft sleeve 14. In the form as illustrated, the setting tabs 66 are arranged to bear against the drive collar 26. With the setting tabs 66 in place, the elastomeric ring 36 remains in its preloaded state as the support assembly 20 can not expand axially along the shaft (which would unload the tension in the elastomeric ring 36) as it is confined axially between the front rotary sealing ring 16 and the drive collar 26 at the rear of the shaft.

The construction of the support assembly 20 with the elastomeric sealing ring 36 disposed between the sleeve 32 and the flanged boss 34 provides an arrangement where the force applied to the stationary sealing ring 18 is concentric and uniform about the axis of rotation CL of the rotatable shaft sleeve 14.

The support assembly 20 provides a fluid barrier for the mechanical seal 10 that extends from the stationary sealing ring 18 to the annular flange 31 of the housing 12, and in effect becomes an internal wall of the pump casing. The sealing ring 36 is thus exposed to the fluid in the pump 100 during operation. The ring 36 forms an integrated part of this fluid impervious barrier (comprising the continuous sealing ring 36 that is bonded to the sleeve 32 and the flanged boss 34 also).

The rear surface 70 of the sealing ring 36 is in contact with the fluid inside the pump because fluid is able to penetrate the space between the end of the flanged boss 34 and the boot 56. This then enables the fluid pressure in the pump to assist in biasing the flanged boss 34 of the support assembly 20 forward in the direction of end 29, thereby contributing to the biasing force which maintains the annular sealing faces 22, 24 in contact. An increase in the fluid pressure within the pump chamber can increase the biasing force. This additional biasing force counteracts, at least to some extent, the force that is applied by the fluid pressure at the joint of the sealing rings 16, 18 which tends to force those members apart. As such the mechanical seal 10 is able to operate effectively under different fluid pressures. This is beneficial in pumping applications where the fluid pressure can fluctuate considerably from start up to being fully operational.

As mentioned above, the sealing rings 16, 18 are each held in place via mounting assemblies. These mounting assemblies include elastomeric couplings 28, 38 which are designed to accommodate torque loading, abutment surfaces 94, 96 against which the sealing rings 16, 18 locate, and which restrain the sealing rings 16, 18 from moving axially, and clamping collars 30, 82 which clamp the respective elastomeric couplings 28, 38. Further, one of the clamping collars 30 includes the abutment surface 94 whereas the other clamping collar 82 is designed to hold the sealing ring 18 against the abutment surface 96.

In the illustrated form, the sealing rings 16, 18 (which are typically ceramic) have a cut-out portion or recess on the rear face (the opposite face to their respective annular sealing faces 22, 24). The elastomeric couplings 28, 38 each have a base portion (72, 74 respectively) that is mounted in that recess and typically bonded in place by a vulcanizing process. The elastomeric couplings 28, 38 also include respective rib portions 76, 78 that extend outwardly from the base portions 72, 74 beyond the respective sealing rings 16, 18 to which they are fitted, and in a plane parallel to the respective annular sealing faces 22, 24. These rib portions 76, 78 are releasably clamped in use, to hold the attached sealing rings 16, 18 in place. Specifically, the rotatable sealing ring 16 is held by a holding piece in the form of the clamping collar 30 clamping the rib portion 76 to the front surface 23 of the shaft sleeve 14. An o-ring 80 may also be fitted to provide a water barrier between the collar 30 and the sealing ring 16. The clamping collar 30 includes the abutment surface 94 on an inner face and bears against the rear face of the sealing ring 16 so as to prevent axial movement of the sealing ring 16 away from the other sealing ring 18. The stationary sealing ring 18 is held by a holding piece in the form of the clamping collar 82 which clamps the rib portion 78 onto the forward surface 85 of the flanged boss 34. Further the sealing ring 18 is clamped in a position where its rear face bears against the abutment surface 96 which is formed on the outer face of the flanged boss 34.

The clamped elastomeric couplings 28, 38 are in the form of resilient rings and designed to accommodate torque and assist in protecting the sealing rings 16, 18, particularly in the start-up phase of use of a pump. In starting up, the torque imparted by the drive shaft 102 needs to overcome the static frictional resistance that exists at the contacting sealing faces 22, 24 to allow the rotatable sealing ring 16 to move relative to the stationary sealing ring 18. This frictional resistance can be high and accordingly the forces induced on the sealing rings 16, 18 can be high. The elastomeric couplings 28, 38 enable the sealing rings 16, 18 to better accommodate these forces by ensuring the torque is transferred and distributed along the sealing rings 16, 18 (because of the continuous contacting surface between the clamping collars 30, 82 and the rib portions 76, 78 of the elastomeric couplings 28, 30) and also by allowing the elastomeric couplings 28, 30 to absorb some of the loading by deformation, thereby acting as a dampener for the mechanical seal 10. A further advantage of an elastomeric coupling 28, 30 is that it provides some resilience close to the sealing interface thereby allowing the sealing rings 16, 18 some ability to adjust and move during operation which assists in maintaining the surfaces of the sealing faces 22, 24 in contact. For the couplings 28, 30 and for any of the other elastomeric parts referred to in this specification, the material of manufacture can be a viscoelastic material such as a polymeric elastomer, or a natural or synthetic rubber or compounded rubber, or a specific rubber product blend (for example, Viton brand). In further embodiments, the elastomeric couplings 28, 30 can be present in the form of multiple, possibly discontinuous, arc-shaped segments fixed to a respective sealing ring 16, 18 rather than in a continuous ring form.

In the illustrated form, the collar 82 has a forward facing surface 84 which incorporates radially extending fins 86. These fins are designed to promote turbulent flow in the vicinity of the sealing rings 16, 18 which assist in cooling the sealing rings 16, 18 by conducting away the frictional heat generated in their general vicinity during use. To further assist in creating this turbulent flow, additional fins 88 are profiled in the front face of the boot 56. It has been found in experimental tests that turbulent flow is sufficient to cool the mechanical seal 10 especially in the vicinity of the sealing rings 16, 18, and without the need for a separate quenching system being incorporated in the mechanical seal 10. This provides considerable advantage both in terms of simplifying the design and reducing the costs of ongoing operation.

In use, the mechanical seal 10 is provided with the biasing device in the form of the elastomeric ring 36, being preloaded. The mechanical seal 10 is fitted to the pump 100 by locating the shaft sleeve 14 on the drive shaft 102 of the pump 100. The annular flange 31 is able to be tilted on the hub 40 of the mechanical seal 10 if required so that the annular flange 31 aligns with the pump casing. The mechanical seal 10 is then secured in place, with the annular flange 31 being bolted to the casing by bolts 90 which are located in receiving holes 13. The shaft sleeve 14 is fitted to the drive shaft 102 by bolts, rivets or screws 92 which extend through receiving holes 15 in the drive collar 26 and which bite into the drive shaft 102. Once fixed in place, the setting tabs 66 can be removed, which ensures that there is adequate running clearance between the drive collar 26 and the hub 40 and that the various components of the support assembly 20 are in appropriate tension and contact. The mechanical seal 10 is now in place and the pump ready for operation.

Figure 5:
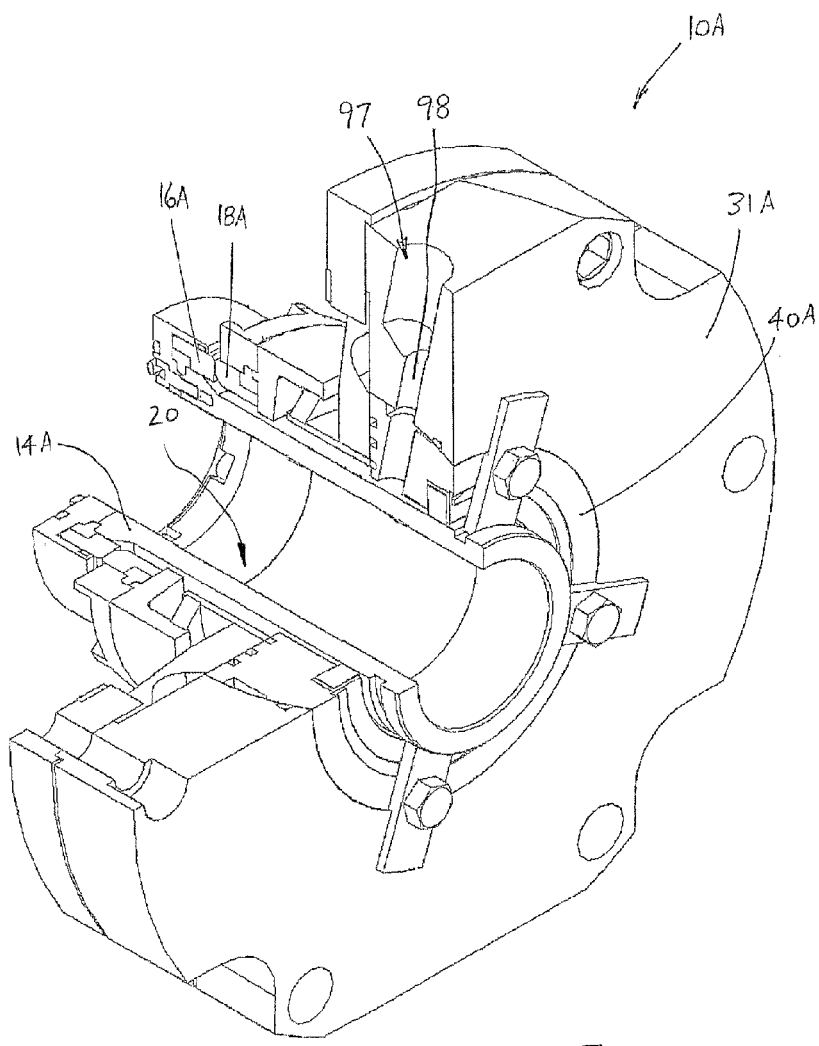
FIG. 5 is a perspective view (with quarter section removed) of another embodiment of a mechanical seal which is similar to the embodiment of FIG. 1.

In a further embodiment shown in FIG. 5, the mechanical seal 10A is in all respects the same as the mechanical seal 10 shown in FIG. 1 to FIG. 4, and for simplicity like parts have been given a similar part number with the additional letter "A". The main difference between the mechanical seals 10, 10A is the presence of a quench system 97 in the mechanical seal 10A. The quench system 97 includes a port 98 that forms an internal conduit which extends through the annular flange 31A of the stationary housing 12A and the hub 40A. The port 98 is arranged for the possible introduction of cooling water into the seal chamber which is located between the shaft sleeve 14 and the various components of the support assembly, as well as the possibility of flushing out any particulate matter which has crept into the seal chamber in use. A second port (not shown) is also provided which forms a similar internal conduit to the port 98 but which is angularly spaced about the axis CL from the port 98 and provides a discharge point for the cooling water introduced into the seal chamber via the port 98.

Referring the FIGS. 6, 6a, 7 and 7a in relation to the mechanical seal 10A, further detail is shown of the elastomeric couplings 28A, 38A. In FIGS. 6 and 6a, the elastomeric coupling 28A is shown in some further perspective detail when bonded to the sealing ring 16A. In FIGS. 7 and 7a, the elastomeric coupling 38A is shown in some further perspective detail when bonded to the sealing ring 18A.

Accordingly, a mechanical seal is provided that is ideally suited for pumps. The seal is of simple construction and is able to operate under fluctuating fluid pressures to provide a uniform biasing force on the sealing faces to maintain those sealing faces in contact. The mechanical seal does not require separate quenching to cool the sealing faces (although this is optionally available in certain embodiments), and it is able be fitted to drive shafts that are out of alignment with the pump casing.

In the claims which follow and in the preceding summary of the invention, except where the context requires otherwise due to express language or necessary implication, the word "comprising" is used in the sense of "including", that is the features specified may be associated with further features in various embodiments of the invention.

In the foregoing description of preferred embodiments, specific terminology has been resorted to for the sake of clarity. However, the invention is not intended to be limited to the specific terms so selected, and it is to be understood that each specific term includes all technical equivalents which operate in a similar manner to accomplish a similar technical purpose. Terms such as "front" and "rear", "inner" and "outer", "above" and "below" and the like are used as words of convenience to provide reference points and are not to be construed as limiting terms.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

Finally, it is to be understood that various alterations, modifications and/or additional may be incorporated into the various constructions and arrangements of parts without departing from the spirit or ambit of the invention.

The invention claimed is:

1. A mechanical seal comprising:
a stationary portion;
a rotatable portion;
a support assembly mounting the rotatable portion to the stationary portion, the rotatable portion being rotatable relative to the support assembly about a rotation axis;
opposed first and second sealing faces, the first sealing face mounted on the rotatable portion and the second sealing face mounted on the support assembly, the first and second sealing faces being arranged to be urged into contact to form a seal therebetween to inhibit ingress of fluid between the rotatable portion and the support assembly; and
a joint permitting rotary movement between the support assembly and the stationary portion to allow adjustment of a position of the rotatable portion relative to the stationary portion without affecting an alignment of the first and second sealing faces;
wherein the support assembly incorporates a base portion that surrounds the rotatable portion, a moveable portion on which the second sealing face is disposed, and a biasing device disposed between the moveable portion and the base portion and operative to impart a biasing force to move the second sealing face into contact with the first sealing face, the biasing device being fluid impervious and forming part of a fluid barrier of the mechanical seal that extends from the seal formed between the first sealing face and second sealing face to the stationary portion; and
wherein the base portion is axially movable relative to the rotatable portion and, in use, a running clearance is provided between the base portion and rotatable portion to permit axial movement between the stationary portion and the rotatable portion.

2. A mechanical seal according to claim 1, wherein the stationary portion includes an aperture through which the rotatable portion extends, and the joint is formed between an outer surface of the support assembly and an inner surface of the stationary portion that defines said aperture.

3. A mechanical seal according to claim 2, wherein the outer and inner surfaces are in sliding contact.

4. A mechanical seal according to claim 2, wherein the joint formed between the outer and inner surfaces is a ball joint to permit rotary movement in all directions of the rotatable portion relative to the stationary portion.

5. A mechanical seal according to claim 2, wherein the joint is fluid impervious.

6. A mechanical seal according to claim 5, wherein an external cover seal extends across the joint to inhibit fluid penetration between the inner and outer surfaces.

7. A mechanical seal according to claim 5, wherein a seal is provided between said inner and outer surfaces.

8. A mechanical seal according to claim 1, wherein the joint prevents axial movement of the rotatable portion relative to the stationary portion in at least one direction.

9. A mechanical seal according to claim 1, wherein the biasing device is in the form of a resilient ring that is placed in tension to impart the biasing force to the second sealing face.

10. A mechanical seal according to claim 1, wherein the support assembly comprises an inner bearing surface that supports said rotatable portion.

11. A pump, comprising:
a pump casing having an aperture;
a drive shaft that extends through the aperture:
a pump chamber defined at least in part by the pump casing, the pump chamber being arranged to contain fluid for processing: and
a mechanical seal providing a fluid seal between the pump casing and the drive shaft, the mechanical seal comprising:
a stationary portion mounted to, or forming part of, the pump casing;
a rotatable portion mounted to, or forming part of, the drive shaft;
a support assembly mounting the rotatable portion to the stationary portion, the rotatable portion being rotatable relative to the support assembly about a rotation axis; and
opposed first and second sealing faces, the first sealing face mounted on the rotatable portion and the second sealing face mounted on the support assembly, the first and second sealing faces being arranged to be urged into contact to form a seal therebetween to inhibit ingress of fluid between the rotatable portion and the support assembly,
wherein a joint permitting rotary movement between the support assembly and the stationary portion is provided to allow adjustment of the position of the rotatable portion relative to the stationary portion without affecting an alignment of the first and second sealing faces;
wherein the support assembly incorporates a base portion, a moveable portion on which the second sealing face is disposed, and a biasing device disposed between the moveable portion and the base portion and being operative to impart a biasing force to move the second sealing face into contact with the first sealing face; and
wherein the base portion, moveable portion and biasing device extend into the pump chamber and form part of a fluid barrier of the pump chamber, the fluid barrier extending from the seal formed between the first sealing face and second sealing face to the pump casing.

12. A pump according to claim 11, wherein the support assembly forms part of a fluid barrier of a seal that forms the fluid seal between the drive shaft and the casing.

13. A pump according to claim 11, wherein the stationary portion includes an aperture through which the rotatable portion extends, and the joint is formed between an outer surface of the support assembly and an inner surface of the stationary portion that defines said aperture.

14. A pump according to claim 13, wherein the outer and inner surfaces are in sliding contact.

15. A pump according to claim 13, wherein the joint formed between the outer and inner surfaces is a ball joint to permit rotary movement in all directions of the rotatable portion relative to the stationary portion.

16. A pump according to claim 11, wherein the joint is fluid impervious.

17. A pump according to claim 11, wherein the support assembly comprises an inner bearing surface that supports said rotatable portion.

18. The pump according to claim 11 wherein the biasing device is fluid impervious.

19. A mechanical seal comprising:
a stationary portion;
a rotatable portion;
a support assembly mounting the rotatable portion to the stationary portion, the rotatable portion being rotatable relative to the support assembly about a rotation axis;

opposed first and second sealing faces, the first sealing face mounted on the rotatable portion and the second sealing face mounted on the support assembly, the first and second sealing faces being arranged to be urged into contact to form a seal therebetween to inhibit ingress of fluid between the rotatable portion and the support assembly; and a joint permitting rotary movement between the support assembly and the stationary portion to allow adjustment of a position of the rotatable portion relative to the stationary portion without affecting an alignment of the first and second sealing faces;

wherein the support assembly incorporates a base portion that surrounds the rotatable portion, a moveable portion on which the second sealing face is disposed, and a biasing device disposed between the moveable portion and the base portion and operative to impart a biasing force to move the second sealing face into contact with the first sealing face; the biasing device being fluid impervious and forming part of a fluid barrier of the mechanical seal that extends from the seal formed between the first and second sealing faces to the stationary portion.

* * * * *